(12) United States Patent
Izardel

(10) Patent No.: US 7,172,307 B2
(45) Date of Patent: Feb. 6, 2007

(54) SOLAR POWERED GARDEN LIGHT

(75) Inventor: Lazar Izardel, Tel Aviv (IL)

(73) Assignee: Gamasonic Ltd., Tel Aviv (IL)

( * ) Notice: Subject to any disclaimer, the term of this patent is extended or adjusted under 35 U.S.C. 154(b) by 106 days.

(21) Appl. No.: 11/028,517

(22) Filed: Jan. 5, 2005

(65) Prior Publication Data

US 2006/0146524 A1  Jul. 6, 2006

(51) Int. Cl.
*F21V 13/00* (2006.01)
*F21V 4/00* (2006.01)
(52) U.S. Cl. .................... 362/183; 362/153.1; 362/276
(58) Field of Classification Search ............... 362/183, 362/184, 190, 191, 276, 802, 153.1
See application file for complete search history.

(56) References Cited

U.S. PATENT DOCUMENTS

| | | | | | |
|---|---|---|---|---|---|
| 5,535,108 | A | * | 7/1996 | Logsdon | 362/183 |
| 5,630,660 | A | * | 5/1997 | Chen | 362/183 |
| 5,785,410 | A | * | 7/1998 | Branson, Sr. | 362/153.1 |
| 6,013,985 | A | * | 1/2000 | Green et al. | 315/149 |
| 6,406,163 | B1 | * | 6/2002 | Yang | 362/183 |

\* cited by examiner

*Primary Examiner*—John Anthony Ward
(74) *Attorney, Agent, or Firm*—Dekel Patent Ltd.; David Klein

(57) ABSTRACT

A garden light assembly including a solar cell assembly adapted for supplying electric current, at least one light mounted on a mounting plate and in electrical communication with the solar cell assembly, and a refractor/reflector positioned to reflect outwards light rays emanating from the at least one light, the refractor/reflector including a curved surface concavely curved with respect to the at least one light.

13 Claims, 2 Drawing Sheets

SOLAR POWERED GARDEN LIGHT

FIELD OF THE INVENTION

The present invention relates generally to garden lights, and more specifically to a solar powered garden light.

BACKGROUND OF THE INVENTION

Some lights use solar power. For example, solar garden lights may be placed in a sunny area for charging and provide light during the night. They typically require no wiring. Some solar lights come on automatically at night time, and others have manual switches or an over-ride switch. Solar garden lights may be used for patios, gardens, walkways, driveways and the like.

An example of a commercially available solar garden light is the SiliconLight Solar Flag & Sign Light from Silicon Solar, Bainbridge, N.Y., US. The SiliconLight is equipped with 13,000 mcd (millicandle) LED bulbs for up to 10 hour of operation.

SUMMARY OF THE INVENTION

The present invention seeks to provide a novel solar powered garden light, as is described more in detail hereinbelow. The term "garden light" throughout the specification and claims encompasses any kind of outdoor light.

There is thus provided in accordance with an embodiment of the present invention a garden light including a solar cell assembly adapted for supplying electric current, at least one light mounted on a mounting plate and in electrical communication with the solar cell assembly, and a refractor/reflector positioned to refract and reflect outwards light rays emanating from the at least one light, the refractor/reflector including a curved surface concavely curved with respect to the at least one light. The curved surface of the reflector may have a parabolic curve or a tulip-shaped curve, for example.

In accordance with an embodiment of the present invention an optical accessory (e.g., a focusing lens) may be positioned between the light(s) and the refractor/reflector, adapted to modulate light rays emanating from the light(s). A light diffuser may be provided through which pass light rays reflected from the refractor/reflector. The light diffuser may have a light transmission in a range from transparent to translucent.

A sealing element may seal the refractor/reflector with respect to other elements of the apparatus against passage of liquid therethrough. The garden light assembly may be mounted on a mounting pole or other structure that supports the mounting plate and the reflector.

BRIEF DESCRIPTION OF THE DRAWINGS

The present invention will be understood and appreciated more fully from the following detailed description taken in conjunction with the drawings in which.

DETAILED DESCRIPTION OF EMBODIMENTS

Figure 1:
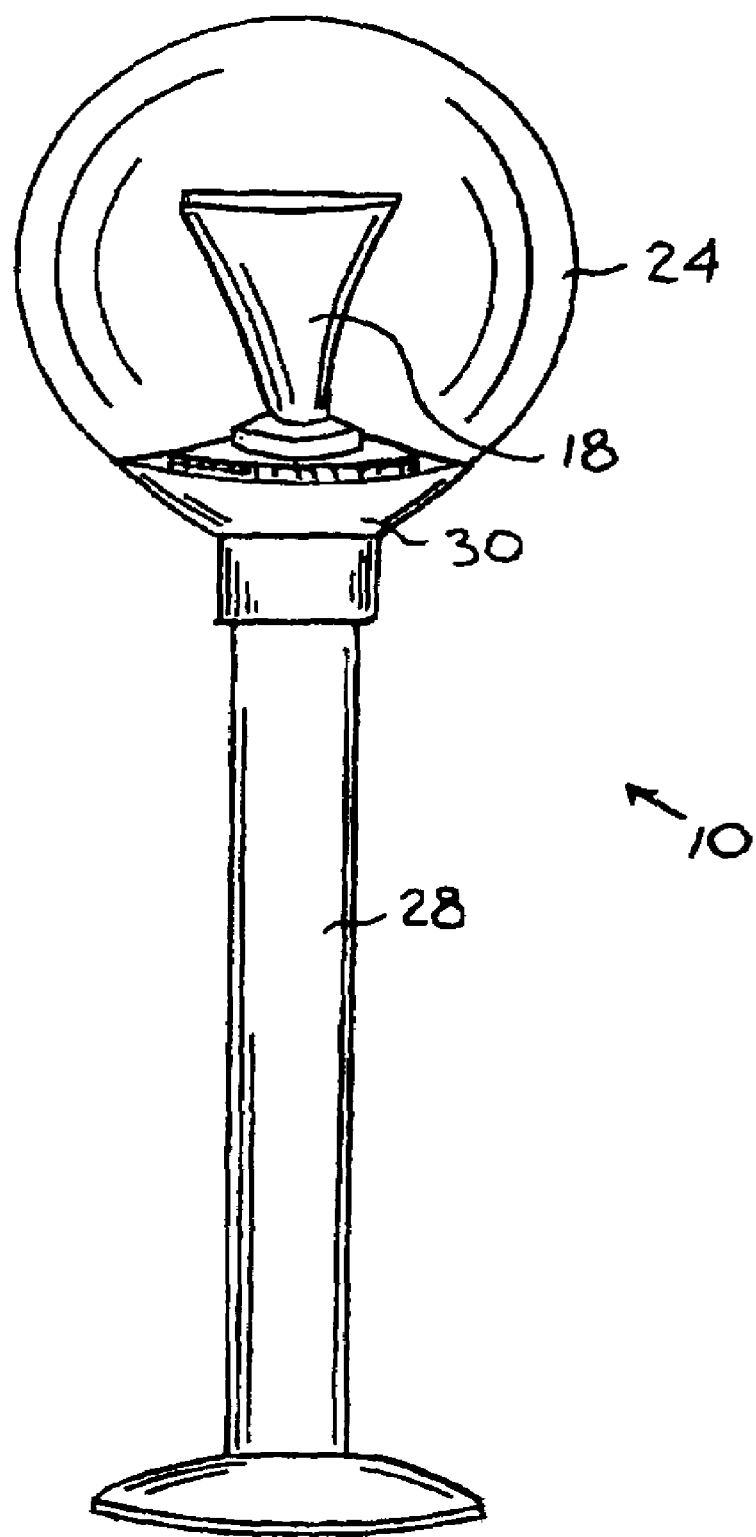
FIG. 1 is a simplified pictorial illustration of a garden light, constructed and operative in accordance with an embodiment of the present invention.
Figure 2:
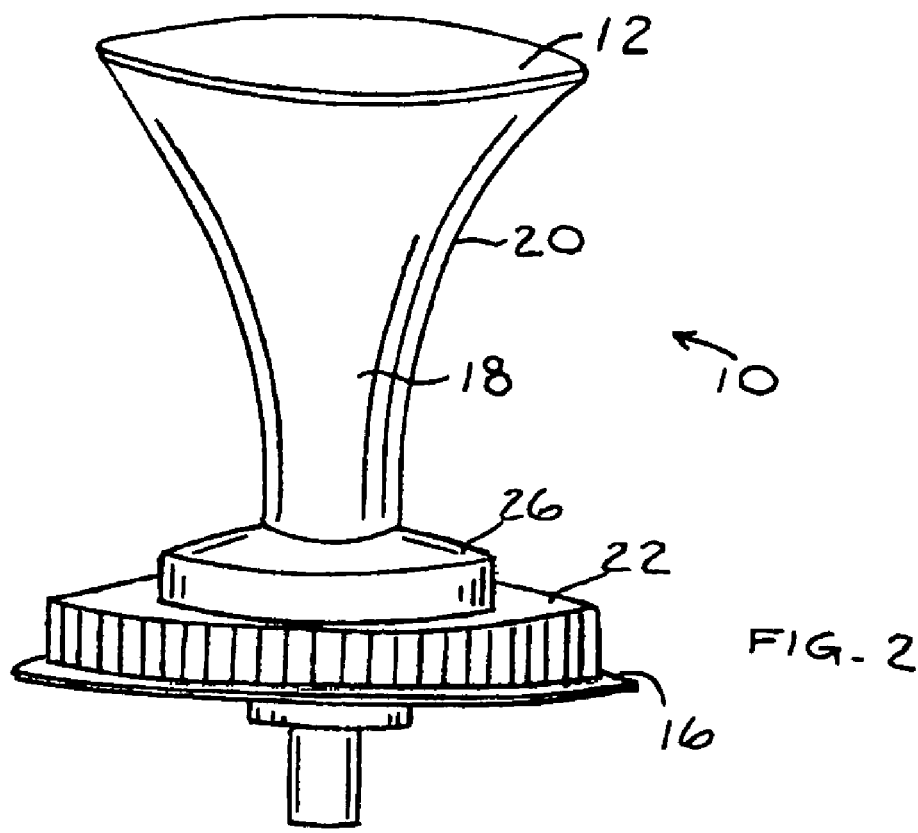
FIGS. 2 and 3 are simplified pictorial illustrations showing inner components of the garden light of FIG. 1.

Reference is now made to FIG. 1, which illustrates a solar powered garden light 10, constructed and operative in accordance with an embodiment of the present invention.

Garden light 10 may include a solar cell assembly 12 adapted for supplying electric current. The solar cell assembly 12 may include a solar cell and solar collector (of any size and shape; the collector may be next to or remote from the cell; in the illustrated embodiment the collector may be at the wide part of the refractor/reflector) for generating electricity, such components being well known and commercially available from many manufacturers.

Figure 3:
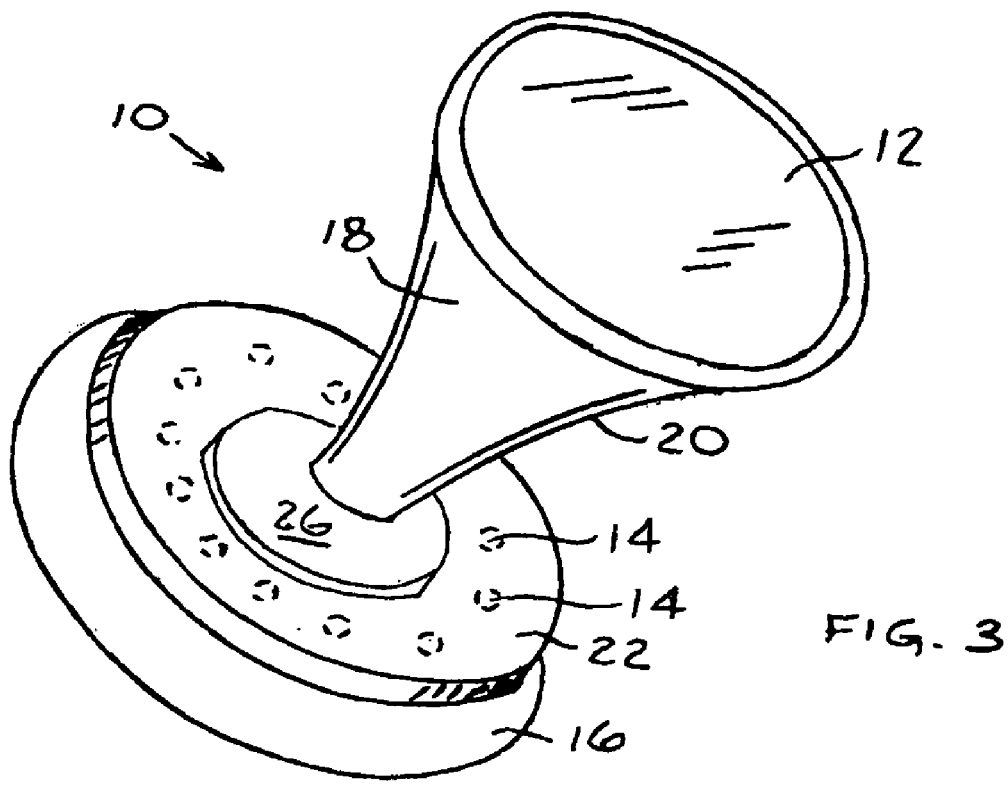

One or more lights 14 (FIG. 3), such as but not limited to, LEDs, may be mounted on a mounting plate 16. Lights 14 may be in electrical communication with the solar cell assembly 12, such as by hard wired connection, printed wire connection and the like. In a preferred embodiment, the lights 14 are LEDs mounted on a printed circuit board with power connection to the solar cell. The lights 14 may be arranged in any pattern, such as but not limited to, a circular pattern or matrix pattern. The lights 14 may be of any size, mcd rating, and color.

A refractor/reflector 18 may be positioned to refract and reflect outwards light rays emanating from the lights 14. The refractor/reflector 18 may have a white, curved surface 20, which is concavely curved with respect to the lights 14. "White" is defined as the color that has no or little hue, due to the reflection of all or almost all incident light. "White" in the specification and claims encompasses, bright white, "dirty" white, off-white, gray-white, snow white, hard-boiled-egg white and other shades of white. Alternatively, the curved surface 20 may be silvered or have a mirror finish (mirrored). The curved surface 20 of the refractor/reflector 18 may be, without limitation, a parabolic curve or a tulip-shaped curve, for example. The periphery of the curved surface 20 about its longitudinal axis may be smooth and round (e.g., conical). Alternatively, the curved surface 20 may be prismatic, that is, have facets about its longitudinal axis.

The refractor/reflector 18 is shown with the broader part of the curved surface 20 facing upwards, but the invention also encompasses the opposite, wherein the curved surface 20 faces downwards or anything in-between.

An optical accessory 22 may be positioned between the lights 14 and the refractor/reflector 18, such as but not limited to, a focusing lens. The optical accessory 22 may modulate (e.g., focus) light rays emanating from the lights 14.

A light diffuser 24 (FIG. 1) may be placed over the refractor/reflector 18, through which pass light rays reflected from the refractor/reflector 18. In the non-limiting illustrated embodiment, the light diffuser 24 is generally spherical and may be transparent or translucent (or anything between). Diffuser 24 may have any size, shape and color.

The garden light 10 may be sealed against liquids, such as rain, and other environmental factors. For example, a sealing element 26, such as a rubber grommet, may be placed at the junction of the refractor/reflector 18 and the optical accessory 22 to seal the refractor/reflector 18 with respect to the rest of the assembly against passage of liquid therethrough.

The garden light assembly may be supported on a mounting pole 28, which may be attached to the assembly with a cup-shaped adapter 30 (FIG. 1). Of course, the garden light assembly may be supported on other fixtures, such as but not limited to, wall-mounted fixtures, low-profile mounts and many others.

External components of the garden light assembly may be constructed of any suitable material, such as but not limited to, metal (e.g., stainless steel, aluminum or others) or plastic (e.g., polycarbonate or other plastics).

It will be appreciated by persons skilled in the art that the present invention is not limited by what has been particularly shown and described hereinabove. Rather the scope of the present invention includes both combinations and subcombinations of the features described hereinabove as well as modifications and variations thereof which would occur to a person of skill in the art upon reading the foregoing description and which are not in the prior art.

What is claimed is:

1. Apparatus comprising:
a garden light assembly comprising a solar cell assembly adapted for supplying electric current, at least one tight mounted on a mounting plate and in electrical communication with said solar cell assembly, and a reflector positioned to reflect outwards light rays emanating from said at least one light, said reflector comprising a curved surface concavely curved with respect to said at least one light, and an optical accessory positioned between said at least one light and said reflector adapted to modulate light rays emanating from said at least one light.

2. The apparatus according to claim 1, wherein said curved surface is white.

3. The apparatus according to claim 1, wherein said curved surface is mirrored.

4. The apparatus according to claim 1, wherein said optical accessory comprises a focusing lens.

5. The apparatus according to claim 1, further comprising a light diffuser through which pass light rays reflected from said reflector.

6. The apparatus according to claim 5, wherein said light diffuser has a light transmission in a range from transparent to translucent.

7. The apparatus according to claim 1, further comprising a sealing element that seals said reflector with respect to other elements of said apparatus against passage of liquid therethrough.

8. The apparatus according to claim 1, wherein the curved surface of said reflector has a parabolic curve.

9. The apparatus according to claim 1, further comprising a mounting pole that supports said mounting plate and said reflector.

10. Apparatus comprising:
a garden light assembly comprising a solar cell assembly adapted for supplying electric current, a plurality of lights mounted on a mounting plate and in electrical communication with said solar cell assembly, and a reflector positioned to reflect outwards light rays emanating from said lights, said reflector comprising a curved surface concavely curved with respect to said lights, wherein said reflector has a longitudinal axis generally perpendicular to said mounting plate and said lights are positioned on the mounting plate about said longitudinal axis.

11. The apparatus according to claim 10, wherein said lights do not touch said reflector.

12. The apparatus according to claim 10, wherein a periphery of the curved surface about said longitudinal axis is conical.

13. The apparatus according to claim 10, wherein said lights are symmetrically positioned on the mounting plate about said longitudinal axis.

* * * * *